US 7,725,617 B2

(12) United States Patent
Codispoti et al.

(10) Patent No.: US 7,725,617 B2
(45) Date of Patent: May 25, 2010

(54) DATA OUTPUT SYSTEM WITH PRINTING DEVICE, AND DATA OUTPUT METHOD, IN PARTICULAR FOR PERFORMING A TEST PRINTING

(75) Inventors: Giuseppe Codispoti, Zurich (CH);
Ernst Dubach, Bremgarten (CH)

(73) Assignee: UBS AG, Zurich (CH)

( * ) Notice: Subject to any disclaimer, the term of this patent is extended or adjusted under 35 U.S.C. 154(b) by 637 days.

(21) Appl. No.: 10/970,989

(22) Filed: Oct. 25, 2004

(65) Prior Publication Data

US 2006/0039014 A1 Feb. 23, 2006

(30) Foreign Application Priority Data

Aug. 19, 2004 (EP) .................................. 04019707

(51) Int. Cl.
*G06F 3/00* (2006.01)
*G06F 13/00* (2006.01)
(52) U.S. Cl. ........................... 710/18; 700/91; 700/108; 710/15; 710/19
(58) Field of Classification Search ........................ None
See application file for complete search history.

(56) References Cited

U.S. PATENT DOCUMENTS 6,685,368 B1 2/2004 Beckman ..................... 400/70

2002/0063884 A1\* 5/2002 Bhogal et al. .............. 358/1.15
2002/0080387 A1\* 6/2002 Grasso et al. .............. 358/1.15
2002/0171868 A1\* 11/2002 Yoshimura et al. ......... 358/1.15
2004/0179078 A1\* 9/2004 Gundjian et al. ............ 347/101

FOREIGN PATENT DOCUMENTS

EP         1 335 319 A2     8/2003
JP         20011325249      11/2001

OTHER PUBLICATIONS

European Search Report Dated Apr. 13, 2007.
EPO Office Action mailed Aug. 26, 2009; UBS AG.

\* cited by examiner

*Primary Examiner*—Tariq R. Hafiz
*Assistant Examiner*—Scott Sun
(74) *Attorney, Agent, or Firm*—Paul, Hastings, Janofsky & Walker LLP

(57) ABSTRACT

The invention relates to a data output method and to a data output system comprising:
  a printing device;
  a database device, in which corresponding reference data and/or control data are stored for a plurality of data output system users; and
  a data output control device that delivers, at points in time determined by the data output control device, output data sets allocated to corresponding users to the printing device, wherein a predefined subset of the output data sets is—for performing a test printing—delivered to the printing device in advance already.

20 Claims, 3 Drawing Sheets

DATA OUTPUT SYSTEM WITH PRINTING DEVICE, AND DATA OUTPUT METHOD, IN PARTICULAR FOR PERFORMING A TEST PRINTING

RELATED APPLICATIONS

This application claims priority from European Patent Application No. 04019707.1 filed on Aug. 19, 2004 and titled "Data Output System with Printing Device, and Data Output Method, in Particular for Performing a Test Printing", which is incorporated herein by reference in its entirety.

FIELD OF THE INVENTION

The invention generally relates to data output systems, in particular, to a data output system with a printing device, a database device, and a data output control device, and a data output method.

BACKGROUND OF THE INVENTION

Data output systems used in prior art (e.g. by banks, insurance companies, etc.) comprise, for instance, a printing device, a database device, and—as an interface between the printing device and the database device—an appropriate data output control device.

The printing device may e.g. be an appropriate rotary printing press, e.g. a sheet-fed rotary printing press, preferably a web-fed rotary printing press (e.g. a (single-or multi-color) web-fed rotary printing press operating pursuant to a corresponding relief, surface, or gravure printing method).

In the case of a web-fed rotary printing press, a coherent paper web rolled off a corresponding paper roll runs through the machine and is cut, possibly folded, and packed (e.g. enveloped) after printing and drying only.

In the database device, a plurality of data may be stored, e.g. corresponding data of bank customers (e.g. prename and surname, or company name, respectively, addresses, information concerning the language to be used, etc.), bank-internal data (e.g. bank-internal addresses, etc.), etc.

The data output control device generates—by using the above-mentioned or further data stored in the database device (and/or one or a plurality of further database devices), and/or data provided by corresponding data delivery applications—corresponding data set printing files that are delivered to the printing device and are printed there.

The above-mentioned further data may, for instance, be corresponding balance of account data, account activity data (account transfer data, interest payment data, account service price data), etc., or, for instance, deposit state data, deposit activity data (purchase, sale, dividend, interest payment data, deposit service price data), etc.

At particular times—especially at the end of the month—there may be a relatively high load of the printing device and delays during printing due to the particularly high printing volume that exists at that time.

For instance, at the end of the month, data output orders—that are possibly triggered automatically—may result in the printing of several thousands of statements of account, of several thousands of statements of deposit, etc.

If the print-out comprises faults, relatively high costs will be incurred since the—entire—print-out possibly will have to be effected again.

Further limitations and disadvantages of conventional and traditional approaches will become apparent to one skilled in the art, through comparison of such systems with the present invention as set forth in the remainder of the present application with reference to the drawings.

It is an object of the invention to provide a novel data output system and a novel data output method, in particular a novel data output system and a novel data output method by means of which the above-mentioned and/or further drawbacks of prior art may be overcome.

SUMMARY OF THE INVENTION

According to the invention, the above or further objects are achieved by the subject matters as defined in the independent claims. The dependent claims define advantageous and preferred embodiments of the present invention.

According to an aspect of the invention, a data output system is provided which comprises:
- a printing device;
- a database device in which corresponding reference data and/or control data are stored for a plurality of data output system users; and
- a data output control device that delivers—at points in time determined by the data output control device—output data sets that are allocated to corresponding users to the printing device, wherein a pre-defined subset of the output data sets is—for performing a test printing—delivered to the printing device in advance already.

Advantageously, the subset of the output data sets that is delivered in advance is then printed—as a test printing—at the printing device.

By this measure it is possible to recognize faults early—even prior to performing the "actual" printing—and to remedy same.

These and other advantages, aspects and novel features of the present invention, as well as details of an illustrated embodiment thereof, will be more fully understood from the following description and drawings.

BRIEF DESCRIPTION OF THE DRAWINGS

The accompanying drawings, which are incorporated herein and form part of the application, illustrate the present invention and, together with the description, further serve to explain the principles of the invention and to enable a person skilled in the pertinent art to make use of the invention.

DETAILED DESCRIPTION OF THE INVENTION

The present invention will now be described in detail with reference to preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

Figure 1:
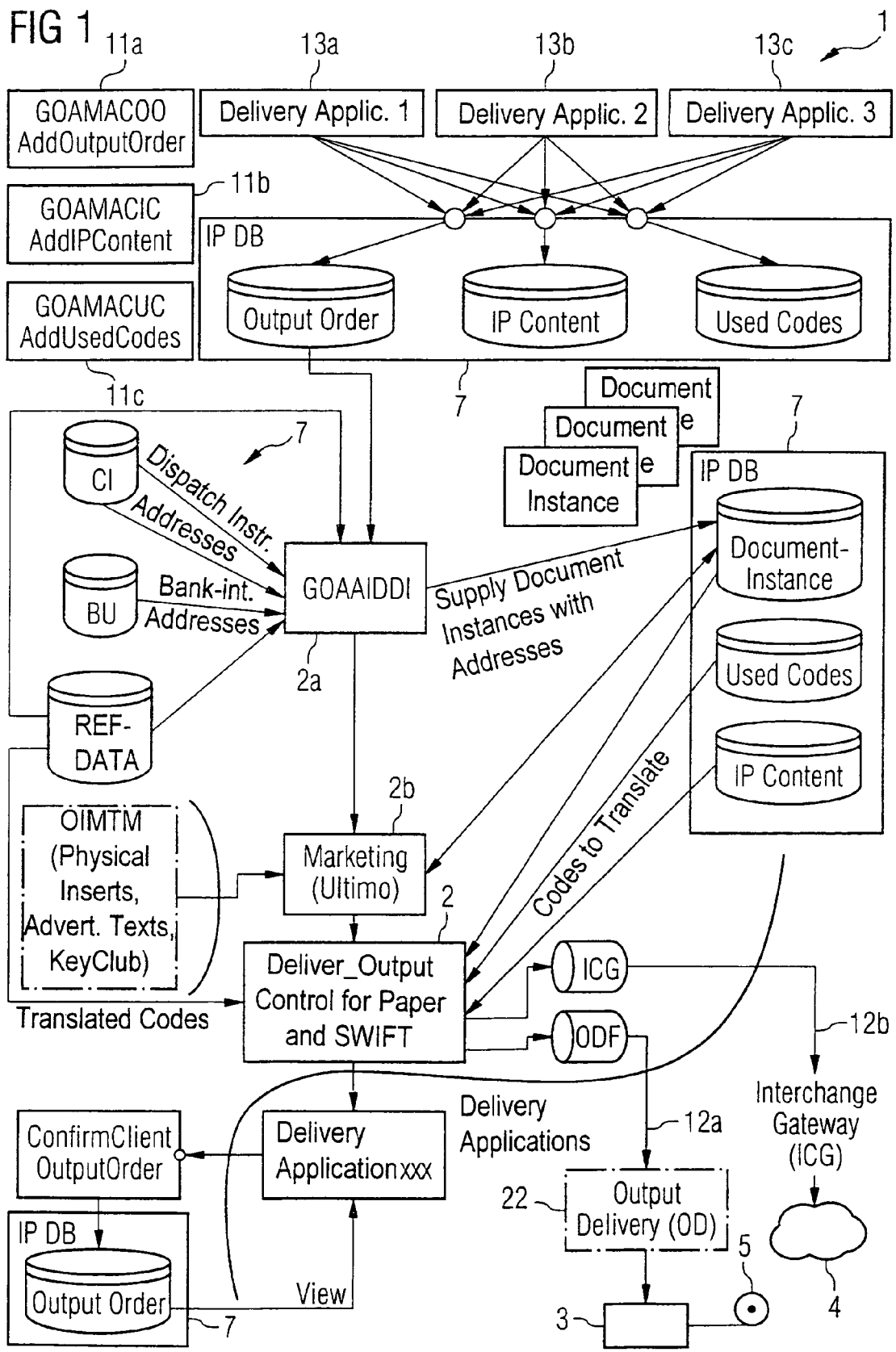
FIG. 1 illustrates a data output system according to an embodiment of the present invention.

In accordance with FIG. 1, a data output system 1 pursuant to an embodiment of the present invention comprises one or a plurality of printing devices 3, one or a plurality of database devices 7, and—as an interface between the printing device 3 and the database device 7—one or a plurality of data output control devices 2.

The data output system 1 may—preferably—be used for outputting data accruing in a bank (or, for instance, an insurance company, etc.), or data generated by computers that are employed there.

As results from FIG. 1, the data output system 1 comprises a plurality of (e.g. more than one (or, alternatively, e.g. more than two or three)) data output channels 12a, 12b, e.g. a printing data output channel 12a ("paper channel") (or, alternatively, e.g. a plurality of printing data output channels), and an electronic data output channel 12b ("SWIFT channel") (or, alternatively, e.g. a plurality of electronic data output channels).

Via the printing data output channel 12a—controlled by the data output control device 2—corresponding output data sets (generated by using the above-mentioned data accruing in the bank (or the insurance company, etc.) or generated by the computers employed there) are delivered to the printing device 3.

The printing device 3 may, for instance, be an appropriate rotary printing press, e.g. a sheet-fed rotary printing press or—preferably—a web-fed rotary printing press 3 (e.g. a (single- or multi-color) web-fed rotary printing press operating pursuant to a corresponding relief, surface, or gravure printing method).

In the case of the web-fed rotary printing press, a coherent paper web rolled off a corresponding paper roll 5 runs through the machine 3 and is cut, possibly folded, and packed (e.g. enveloped) after printing and drying only.

Alternatively or additionally to the printing device 3, the above-mentioned (and/or further) output data sets are—also controlled by the data output control device 2—delivered via the electronic data output channel 12b (also) to one or a plurality of electronic data communication systems 4, so that the output data sets may be recalled electronically by corresponding system users, in particular bank customers and/or bank staff.

Recalling will only become possible once appropriate passwords, codes, etc. have been entered by the system users via the data communication system 4, i.e. once the respective system user has been activated correspondingly.

The data communication system 4 may, for instance, be one or a plurality of computer networks, e.g. the internet, and/or one or a plurality of intranets, and/or one or a plurality of further, electronic data communication systems, e.g. a public or private telephone network, e.g. a fixed network or a mobile network, etc.

In the above-mentioned database devices 7 (e.g. an information package database ("IP DB"), etc.), a plurality of data may be stored, e.g. corresponding data of bank customers (Client Information ("CI")) (e.g. the prenames and surnames of private customers, or the company names of company customers, respectively, addresses, etc.), bank-internal data ("BU") (e.g. the prenames and surnames of bank staff, bank-internal addresses (department, address of location, etc.)), tax data ("Used Codes") (e.g. information concerning the respective language to be used, the respective data to be used, the priority data, etc.), and/or a plurality of further data, e.g. IP Content data, in particular corresponding reference data (e.g. balance of account data, account activity data (account transfer data, interest payment data, account service price data), etc., and/or, for instance, deposit state data, deposit activity data (purchase, sale, dividend, interest payment data, deposit service price data), etc., data output order data ("Output Order"), etc.

The modification/generation/supplementation of corresponding Output Order and Used Code data, etc. may be performed by controlling appropriate services software programs or program modules 11a, 11b, 11c, etc., and may, for instance, be triggered by corresponding requests of corresponding delivery applications 13a, 13b, 13c (delivery application 1, delivery application 2, delivery application 3, etc.).

As results from FIG. 1, data set printing files ("documents") containing corresponding data sets are generated from the data stored in the database device(s) 7, which are—via the printing data output channel 12a and controlled by the data output control device 2—delivered to the printing device 3 and are printed there.

In so doing—as also results from FIG. 1 (cf. e.g. the method steps illustrated there (performed or caused by appropriate software programs or program modules 2a, 2b)-, corresponding further data (e.g. bank-internal data, bank customer data—in particular addresses-, etc.) that correspond to corresponding reference data (e.g. balance of account data, account activity data, or deposit state data, deposit activity data, etc.) may be added, and—further—data, in particular advertising data that are, for instance, stored in a further database device (e.g. advertising slogan data, data for physical inserts, customer binding program ("Key-Club") data, etc.) may be added to the documents generated this way.

Figure 2:
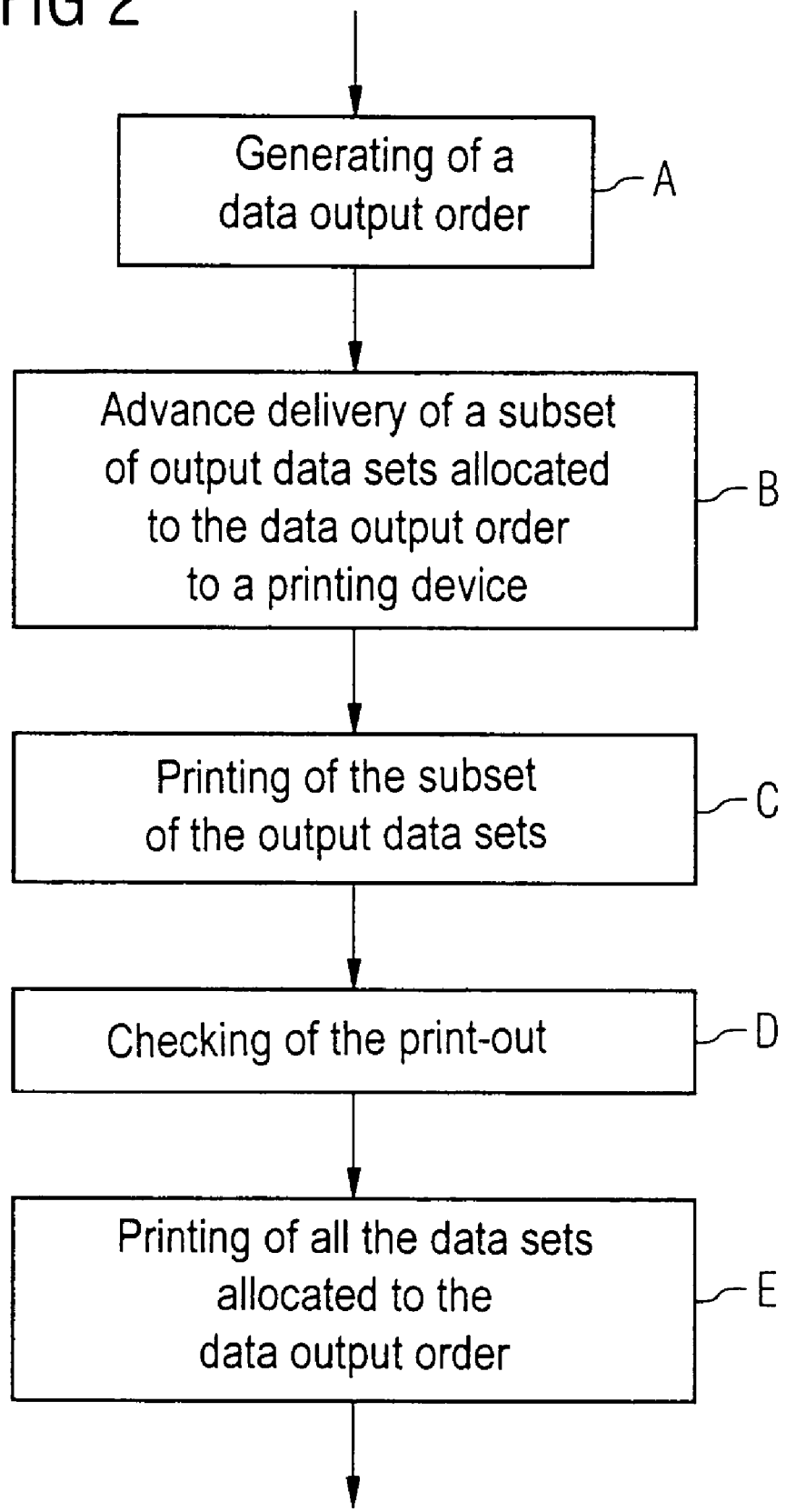
FIG. 2 is a flowchart for illustrating the method steps performed with a data output method according to an embodiment of the invention.

The triggering of corresponding data output orders ("Output Order") for the above-mentioned data output channels 12a, 12b—e.g. by a corresponding (delivery) application—may be performed automatically or semi-automatically, respectively, e.g. time-controlled (e.g. every quarter of an hour, every hour, every day, every week, every month, etc.), and/or condition-controlled (e.g. by an interest termination), and/or time and condition-controlled (e.g. a particular time after a particular event), and/or can be triggered—by a bank staff member and/or a bank customer, etc.—"manually" or "ad hoc" (e.g. by inputting a corresponding data output order at a computer connected to the data output system 1)—cf. also method step A illustrated in FIG. 2.

In a "normal operation mode" of the data output system 1, all the data sets or data set printing files, respectively, that are allocated to the respective data output order are—in reaction to a corresponding ("normal") data output order—immediately (or consciously delayed by a particular delay time) provided or compiled, are stored intermediately in an appropriate memory device or database device, respectively, and are (immediately, or consciously delayed by a particular delay time) delivered to the printing device 3 for printing.

Contrary to this, in a "test operation mode" of the data output system 1, at first not all the data sets or data set printing files, respectively, that are allocated to the corresponding data output order are—in reaction to a corresponding "normal" or specific "test" data output order (which is, in particular, triggered "manually", or automatically or semi-automatically, e.g. time-controlled (e.g. at the end of a month ("Ultimo")))—provided or compiled (in a finished manner), but merely a—predetermined—subset thereof (e.g. less than 50%, in particular less than 20% or 10% of the—entire—data sets allocated to the respective data output order (but, for instance, more than 1% or 2%, in particular more than 5% of the respective data sets, etc.)—e.g. less than 10,000 or 2,000 data sets, and/or e.g. more than 50 or 100 data sets, etc.).

It is, for instance, possible that merely the predetermined subset of the data sets or data set printing files, respectively, is compiled in a finished manner, and that the remaining data sets or data set printing files, respectively, are only compiled partially or incompletely ("semi-finished state" of the remaining data sets).

Advantageously, the data output system 1 can, in particular at times with a high printing volume, e.g. at the end of the month, be transferred (e.g. by means of appropriate instructions input e.g. by a systems administrator (in particular a bank staff member) in an appropriate computer connected to the data output system 1, or automatically) from the above-mentioned "normal operation mode" to the above-mentioned "test operation mode" (or the above-mentioned specific "test" data output order can preferably be generated at times with a high printing volume, respectively).

The above-mentioned subset of the data sets allocated to the ("test") data output order is advantageously (apart from possible exceptions, cf. below) provided or compiled immediately (i.e. without a consciously selected, additional delay), is possibly stored intermediately (for a short time) in an appropriate memory device or database device, respectively, and is (apart from possible exceptions, cf. below) delivered immediately (i.e. without a consciously selected, additional delay) to the printing device 3 for printing (cf. also method step B illustrated in FIG. 2).

In the above-mentioned "test operation mode", the ("test") data output order(s) or test data partial output order(s), respectively, is/are thus processed with high priority, i.e. in a preferred manner (in particular with a higher priority than the above-mentioned "normal" data output orders).

This does not apply to specific, highest-priority data output orders that have to be processed in the "test operation mode" (or to data output orders relating to specific—highest-priority—users (bank customers), and/or to data output orders relating to specific, highest-priority data sets irrespective of the user).

Data characterizing the priority of a user ("user priority data") may, for instance, be defined by a systems administrator (in particular a bank staff member) (e.g. by inputting the corresponding data in a computer connected to the data output system 1 (e.g. upon corresponding instruction of the customer)), and/or by the respective user (in particular the bank customer) himself/herself (e.g. also by inputting the corresponding data in a computer connected to the data output system 1 (after appropriate passwords, codes, etc, have been input)), etc.

Correspondingly similar, data characterizing the priority of a data set (or—preferably—the priority of a plurality of similar data sets) ("data set priority data") may, for instance, be defined by a systems administrator (in particular a bank staff member), and may be input in an appropriate computer connected to the data output system 1.

In the case of data sets with high or highest priority, respectively, the data sets may, for instance, be data sets triggering corresponding legally stipulated or contractually agreed final terms (e.g. data sets containing data for making up the accounts, etc.).

If, in the "test operation mode", the above-mentioned specific, highest-priority data output orders should have to be processed (or the above-mentioned data output orders relating to specific—highest-priority—users (bank customers), and/or specific, highest-priority data sets irrespective of the user), ("test" and/or other) data output orders that are possibly existing will be deferred for a while, and the data sets allocated to the corresponding, specific, highest-priority data output order will at first be provided or compiled (preferably without a consciously selected, additional delay), will possibly be stored intermediately (for a short time) in an appropriate memory device or database device, respectively, and will immediately (i.e. without a consciously selected, additional delay) be delivered to the printing device 3 for printing.

Only then will the above-mentioned subset of the data sets allocated to the ("test") data output order be provided or compiled (in a finished manner), and be delivered to the printing device 3 for printing.

After the data set subset (or the corresponding data set printing files, respectively ("documents")) allocated to the ("test") data output order have been delivered to the printing device 3, they are printed there in the form of a "test printing" (cf. method step C illustrated in FIG. 2).

Subsequently, the corresponding print-out may be examined, i.e. checked—manually and/or automatically—for possible (e.g. bank-technical) faults (cf. method step D illustrated in FIG. 2).

For the test printing (or as subset data sets compiled for the test printing, delivered to the printing device 3, and printed there), data sets that are merely related to particular, pre-selected "standard" test accounts instead of to a "complete" account set may, for instance, be used. As "standard" test accounts, accounts may, for instance, be used that represent a spectrum of the corresponding "complete" account set that is as broad as possible (e.g. test accounts with respectively different combinations of customer types (private customers, company customers, customers in different countries), respective inserts to be used, respective languages to be used, customer priorities, etc.). Data indicating the corresponding test accounts or selecting the test accounts from the plurality of accounts of the respective "complete" data output order, respectively, may, for instance, be stored in an appropriate database 60 ("Selective Account Database").

Preferably—in the communication between the data output control device 2 and the printing device 3—the data of the data set subset of the ("test") output order (and possibly a file name characterizing same) are written in a corresponding, specific test spool queue.

Furthermore—advantageously—the above-mentioned subset test printing may be performed at the printing device 3 by making use of a specific, separate test paper roll 5, or by making use of a specific endless paper printed in batch printing, respectively.

After—or already during—the above-mentioned test printing (in particular automatically or "manually"—in particular after checking the test print-out and (in case it is absent of faults) the corresponding releasing), a "final" data output order may be triggered or generated, said "final" data output order corresponding to the above-mentioned specific "test" data output order (or to the above-mentioned "normal" data output order which, however, resulted in the above-mentioned data set subset print-out only) (alternatively—as has already been mentioned above—the partial or incomplete ("semi-finished") compiling of the remaining data sets or data set printing files, respectively, may already be started during the—finished—providing or compiling of the above-mentioned subset of the data sets or data set printing files, respectively).

In reaction to the "final" data output order—other than with the ("test") data output order—(correspondingly similar to "normal" data output orders in the "normal operation mode"), it is not only the above-mentioned subset of the data sets or data set printing files, respectively, allocated to the corresponding data output order which is provided or compiled in a finished manner, but all the data sets or data set printing files, respectively, allocated to the corresponding data output order (e.g. data sets relating to the "complete" account set).

The—finished—providing or compiling of the data sets may—correspondingly similar to "normal" data output orders in the "normal operation mode"—be performed immediately in reaction to the corresponding, "final" data output order, or—consciously—delayed by a particular delay time.

If desired, the data output system 1 may be transferred back from the above-mentioned "test operation mode" to the above-mentioned "normal operation mode" beforehand.

The—completely—provided or compiled data sets or data set printing files, respectively, may be stored intermediately in a corresponding memory device or database device, and may be delivered (correspondingly similar to "normal" data output orders in the "normal operation mode", immediately or—consciously—delayed by a particular delay time) to the printing device 3 for printing.

After the—complete—data sets (or the corresponding data set printing files, respectively ("documents")) allocated to the "final" data output order have been delivered to the printing device 3, they are printed there as "final complete printing" (cf. method step E illustrated in FIG. 2).

Preferably—in the communication between the data output control device 2 and the printing device 3—the data set data of the "final" output order (and possibly a file name characterizing same) are written in a corresponding spool queue that differs from the above-mentioned test spool queue.

Furthermore—advantageously—the above-mentioned final complete printing at the printing device 3 may be performed by using a (not illustrated) paper roll that differs from the above-mentioned specific, separate test paper roll 5 or from the above-mentioned endless paper printed in batch printing, respectively.

In order to preserve the clients' anonymity, a part of the data contained in the subset of the output data sets that has been delivered in advance may not be printed during the above-mentioned test printing (and/or the corresponding part of the data may not be provided or compiled and/or not be delivered from the data output control device 2 to the printing device 3). The data that are not printed may, for instance, be data identifying the respective user (e.g. prename and/or surname, or company name, respectively, addresses, etc.).

Alternatively or additionally—e.g. for preserving the customers' anonymity—a part of the data contained in the subset of the output data sets that has been delivered in advance may indeed be printed during the above-mentioned test printing, but may then be overprinted, in particular such that it becomes illegible. The—overprinted—data may, again, e.g. be data identifying the respective user (e.g. prename and/or surname, or company name, respectively, addresses, etc.).

Advantageously, during test printing the subset of the output data sets that has been delivered in advance is printed at the printing device 3 together with additional data characterizing the print-out as test printing (e.g. provide the print-out with the writing or an overlay "test" or "verify"). These additional test printing characterizing data may be added to or incorporated in the output data sets during their providing or compiling (at the end of the providing or compiling process) (or may be delivered from the data output control device 2 to the printing device 3 together with the output data sets, respectively). Advantageously, data identifying the respective user (prename and/or surname, or company name, respectively, and/or address) (or a part thereof) are "overprinted" with the overlay or the writing "test" or "verify" (so that the prename and/or surname, or company name, respectively, and/or the address are no longer legible), or—and this is of particular advantage—are partially printed (e.g. by making use of correspondingly spaced dots for the respective letters and/or by making use of letters with correspondingly spaced contour lines, etc.) such that the prename and/or surname, or the company name, respectively, and/or the address, etc. are still legible. By the overprinting or partial printing, respectively, of the above-mentioned data (prename and/or surname, or company name, respectively, and/or address) it can be prevented that a test print-out is dispatched inadvertently.

The possible—delayed—providing or compiling and/or—delayed—delivery of the data sets or data set printing files, respectively, to the printing device 3 for a "normal" data output order in the "normal operation mode" (or possibly also in the "test operation mode") that has been mentioned briefly above may, for instance, be performed as a function of control data characterizing the utilization of the printing device 3, and/or as a function of control data characterizing the priority of a user (allocated to the respective data set) (bank customer) ("user priority data"), and/or as a function of control data characterizing the priority of the respective data set ("data set priority data") irrespective of the user, etc.

The—predetermined or calculated (consciously selected (in addition to system-immanent delays)) delay period may be relatively long, e.g. more than one hour or more than 24 hours, in particular more than one or several weeks.

By a flexibly selected delay time for the respective data set—depending on the respective utilization of the printing device 3 and the user and/or data set priority—there may be achieved that—even at "peak periods" (e.g. at the end of the month or at the end of the year)—the printing device 3 is not overloaded (since then predominantly data sets for users with high user priority data and/or data sets with high data set priority data—irrespective of the respective user—may be printed).

The above-mentioned data output control device 2 may be designed such that the providing/delivering of the data sets for users with high priority is—tendentially—delayed less than the providing/delivering of the data sets for users with low priority (and e.g. such that for users with highest priority the data sets are provided/delivered without any delay, if possible).

Correspondingly similar, the data output control device 2 may be designed such that the providing/delivering of data sets with—user-independently—high data set priority is—tendentially—delayed less than the providing/delivering of data sets with—user-independently—low data set priority (and e.g. such that data sets with highest data set priority are provided/delivered without any delay and irrespective of the respectively concerned user, if possible).

The above-mentioned—delayed—providing or compiling, and/or the—delayed—delivering of the data sets or data set printing files, respectively, to the printing device 3 may—in particular for users with user priority data characterizing a low user priority, and/or for data sets with data set priority data characterizing a low data set priority—be, alternatively or additionally, e.g. also performed such that—at first—output data sets allocated to a user are collected and are only then delivered by the data output control device 2 to the printing device 3 and are printed there when the total data amount of the collected output data sets allocated to the user exceeds a predetermined minimum amount, or the data contained in the collected output data sets exceed a predetermined minimum printing face during printing.

The minimum amount or the minimum printing face, respectively, may—again—depend on the user priority data allocated to the respective user.

By this measure it may be achieved that—simultaneously for one and the same customer—one or several print-outs containing a plurality of data sets may be produced, which can be dispatched in one and the same envelope.

The result thereof is that forwarding expenses can be saved in a substantial scope.

Preferably, the data sets allocated to a particular user are, for this purpose, collected and delivered to the printing device 3 such that as many output data sets as possible that are allocated to one and the same user are printed on one and the same paper roll 5.

With a preferred development of the data output system 1, the collected output data sets allocated to a particular user are delivered to the printing device 3 and printed at the latest when a predetermined maximum period has lapsed since the ordering of the first output data set relating to the respective user (i.e. the first data output order).

The maximum period may—again—be selected as a function of the user priority data allocated to the respective user, and—in particular in the case of a user with user priority data characterizing a high user priority—be e.g. shorter than or equal to 1 week, in particular shorter than or equal to 24 hours, or—in particular in the case of a user with user priority data characterizing a low user priority—be longer than 24 hours, in particular longer than a week (and e.g. shorter than two months, in particular shorter than one month).

By this measure it can be prevented that a user has to wait for too long a time for the data (statements of account, statements of deposit, etc.) that are destined for him/her and have to be sent to him/her.

The above-mentioned—delayed—providing or compiling, and/or—delayed—delivery of the data sets or the data set printing files, respectively, to the printing device 3 can—alternatively or additionally to what has been said above—e.g. also be performed as a function of the capacity of the paper roll 5 printed by the printing device 3, etc.

By that, a reasonable and quick output of data that avoids capacity bottlenecks and is nevertheless capable of flexibly complying with specific customer requests can—altogether—be achieved.

With an advantageous development of the data output system—correspondingly similar as described above for the printing data output channel 12a ("paper channel")—a "test operation mode" of the data output system 1 may additionally also be provided for the electronic data output channel 12b ("SWIFT channel"). In reaction to a corresponding ("normal" or specific "test") data output order (in particular triggered "manually"), at first (as described above) not all the data sets allocated to the corresponding data output order are provided or compiled (in a finished manner), but merely a—predetermined—subset thereof (e.g. less than 50%, in particular less than 20% or 10% of the—entire—data sets allocated to the respective data output order (but e.g. more than 1% or 2%, in particular more than 5% of the respective data sets, etc.)—e.g. less than 10,000 or 2,000 data sets and/or e.g. more than 50 or 100 data sets, etc.).

The predetermined subset of the data sets is then—controlled by the data output control device 2—stored (intermediately) in a corresponding memory device and delivered via the electronic data output channel 12b to the above-mentioned electronic data communication system(s) 4, so that the output data sets may be electronically recalled by test system users having an appropriate specific authorization, in particular a systems administrator.

If the test data sets are correct, a "final" data output order corresponding to the above-mentioned specific "test" data output order (or the above-mentioned "normal" data output order resulting, however, only in the above-mentioned data set subset output) can be triggered or generated, respectively (in particular "manually" (or automatically)).

In reaction to the "final" data output order—other than with the ("test") data output order—(correspondingly similar to "normal" data output orders in the "normal operation mode"), it is not only the above-mentioned subset of the data sets allocated to the corresponding data output order that is provided or compiled in a finished manner, but all the data sets allocated to the corresponding data output order.

The data sets are then—controlled by the data output control device 2—stored (intermediately) in a corresponding memory device and delivered via the electronic data output channel 12b to the above-mentioned electronic data communication system(s) 4, so that the complete output data sets may then be electronically recalled by the respectively authorized, normal system users, in particular bank customers.

Figure 3:
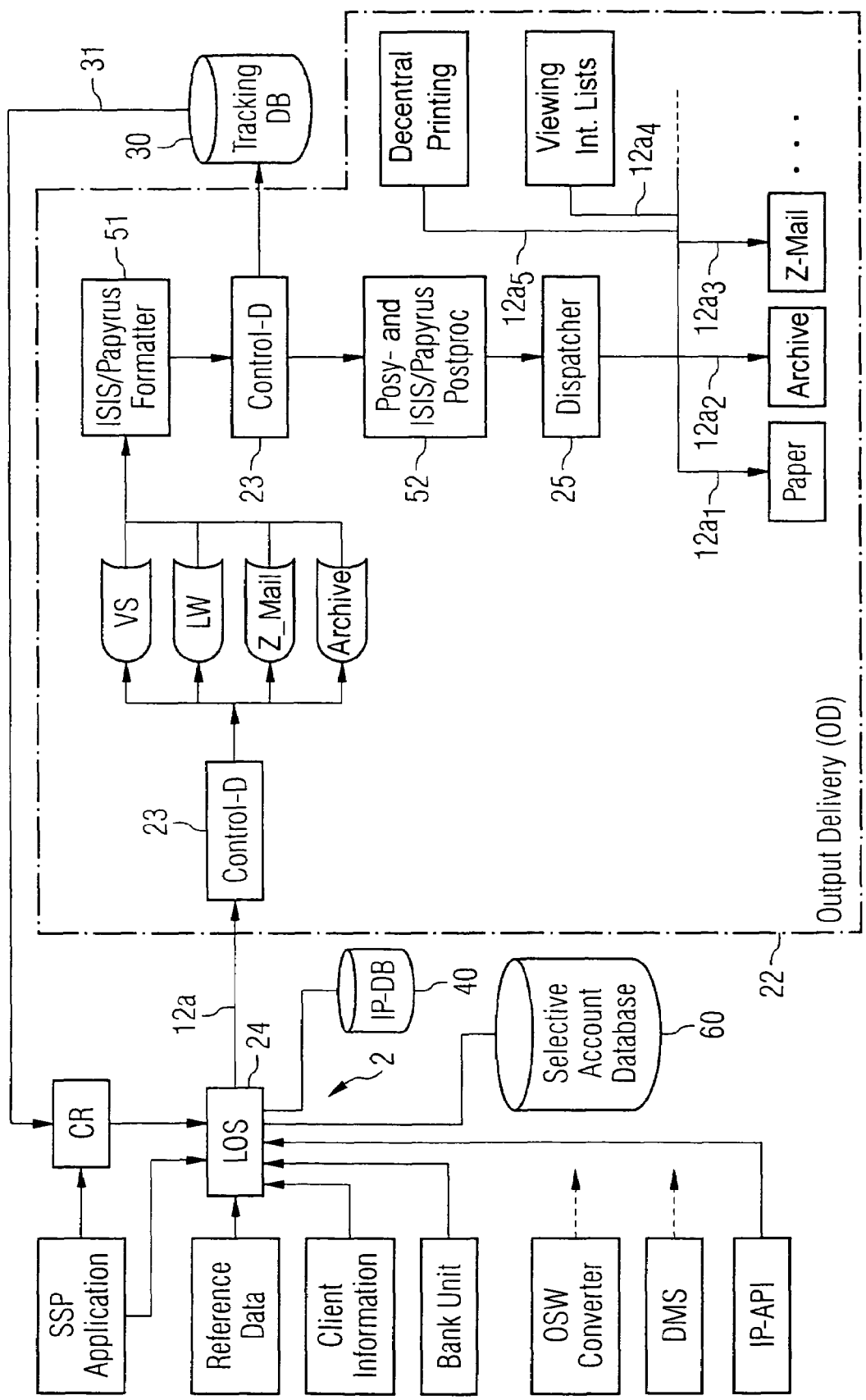
FIG. 3 is a schematic detail representation of the data output control devices and data output channels used with an advantageous development of the invention.

With an advantageous development or further development of the data output system 1 or data output method, respectively, described above by means of FIGS. 1 and 2, the above-mentioned data output control function (in particular the data set collecting or forwarding delay function, or the above-mentioned test data collecting or forwarding function, respectively (and possibly further functions)) is, in accordance with FIG. 3 (and as illustrated in FIG. 1 in broken lines) not performed by the above-mentioned data output control device 2 alone, but by the data output control device 2 (in particular by one or several software programs or software program modules 24 ("LOS") provided there) and a—further—data output control device 22 co-acting with the data output control device 2 (in particular by a software program or software program module 23 ("Control-D") provided there).

The further data output control device 22 may, for instance, be positioned at a distance (e.g. more than 10 m, 1 km, etc. away) from the data output control device 2, e.g. in the proximity of or at the above-mentioned printing device 3 (or in a printing center, respectively), and the data output control device 2 may, for instance, be positioned in a computer center, e.g. the computer center of the bank/insurance company utilizing the data output method.

As results from FIG. 3, the data sets or data set printing files, respectively (or corresponding test printing files, respectively) that are provided—possibly with delay—or delivered—possibly with delay—by the data output control device 22 (i.e. that have been stored intermediately before in a memory device not illustrated and connected with the data output control device 22) may, for instance, be delivered to an end data output channel $12a_1$ "Paper" that is connected with the above-mentioned printing device 3 (and may then—in correspondence to what has been described above—be printed by the printing device 3).

Alternatively or additionally—as is illustrated in FIG. 3—the data sets or data set printing files, respectively (that are, for instance, also delivered to the end data output channel $12a_1$ "Paper" (or "Z_Mail", etc.) and are printed, for instance, by the printing device 3) may e.g. also be delivered to an end data output channel $12a_2$ "Archive". The corresponding data sets or data set printing files, respectively—available in a finished printing format—may then be stored permanently—for archiving purposes—(in the above-mentioned printing format or appropriately condensed) in an appropriate (not illustrated) database (e.g. for a certain minimum period, e.g. longer than 1 month, or longer than 1 year, in particular longer than 4 years, etc.).

Alternatively or additionally, data sets or data set printing files, respectively, may—possibly with delay—also be delivered by the data output control device 22 to an end data output channel $12a_3$ "Z_Mail", and be printed by the printing device 3—or a further printing device. Other than e.g. with the above-mentioned end data output channel $12a_1$ "Paper", in the case of the end data output channel $12a_3$ "Z_Mail" the print-outs produced are not dispatched externally after enveloping, but are deposited in the bank and are fetched by the respective customer himself/herself.

As results further from FIG. 3, data sets or data set printing files, respectively, may, alternatively or additionally, also be delivered (possibly with delay) by the data output control device 22 e.g. to an end data output channel $12a_5$ "Decentral Printing" and be printed decentrally at further printing devices that are different from the printing device 3 and are possibly positioned remote from the latter and/or from the data output control device 22 (e.g. more than 1 km, 10 km, or 100 km away).

Alternatively or additionally, corresponding data sets or data set printing files, respectively, may also be delivered by the data output control device 22 e.g. to an end data output channel $12a_4$ "Viewing, Internal Lists", may be converted to an appropriate electronic format (e.g. the pdf format), and may be printed locally by staff members of the bank or of the insurance company, respectively (i.e. remote from the above-mentioned control device 22 and/or from the above-mentioned printing device 3, e.g. more than 1 km, 10 km, or 100 km away thereof)—at a computer assigned to the respective staff member or the respective staff group (or the printing device allocated to this computer, respectively).

Alternatively or additionally, corresponding data sets or data set printing files, respectively, may—as results from FIG. 3, controlled by a dispatcher 25—also be delivered to one or several further end data output channels, e.g. to an end data output channel "electronic mail", etc.

In the channel "electronic mail", the data sets may be converted to an appropriate electronic format (e.g. the pdf format), and may be sent electronically, e.g. by email (and attached pdf file) to the corresponding customers, and may be printed locally by the customers (i.e. remote from the above-mentioned control device 22 and/or the above-mentioned printing device 3, e.g. more than 1 km, 10 km, or 100 km away thereof) at the computer of the respective customer (or at a printing device allocated to the computer, respectively). Alternatively or additionally, the respective customer may also recall the corresponding data via a specific internet site (supplied by the channel "electronic mail" with the corresponding data) that is accessible to the respective customer only or is protected by a password, respectively, and may print them locally, etc.

As results further from FIG. 3, the data output control device 22 stores (in particular by the software program or the software program module 23) data with respect to the costs accruing with the above-mentioned data output method, in particular—for the end data output channels $12a_1$, $12a_5$, etc.—with respect to the number of/postage expenses for the envelopes sent to a particular customer (and/or with respect to the costs accruing at the end data output channel "electronic mail" and/or "Z_Mail", etc. for a particular customer, etc.) in an appropriate memory device 30 (tracking database ("Tracking DB")) and are—via a channel 31—delivered to the above-mentioned control device 2 (in particular the software program or the software program module 24 ("LOS")), so that corresponding data output costs, in particular postage data, are added to the above-mentioned data sets for the respective customer, so that these costs may be charged to the customer.

As has already been mentioned, with the advantageous development of the invention as illustrated in FIG. 3, the data output control function is performed—jointly—by the control device 2 and the control device 22.

As results from FIG. 3, the data sets provided/collected by the data output control device 2 may be stored intermediately in a memory device 40 (here: an IP database (IP-DB)) connected with the data output control device 2, may be read out again, and may be transmitted—as explained above, possibly with delay—via the channel $12a$ to the data output control device 22, in particular the above-mentioned software program or software program module 23.

As is also illustrated in FIG. 3, corresponding data sets transmitted—possibly with delay—by the software program or the software program module 23 to a corresponding software program or software program module 51 ("ISIS/PAPYRUS FORMATTER") are formatted by the software program or the software program module 51 and are then—in formatted form—delivered (back) to the above-mentioned software program or software program module 23.

The data sets delivered (back) to the software program or software program module 23 are transmitted from there—possibly with delay—to a corresponding (further) software program or software program module 52 ("ISIS/PAPYRUS POSTPROCESSING"), are subjected to a corresponding postprocessing there, and are then transmitted to the above-mentioned dispatcher 25.

As has already been mentioned before, corresponding data sets (e.g. received by the control device 2, and/or the software program or the software program module 51) may—in a correspondingly similar manner as with the data output control device 2—be stored intermediately by the software program or the software program module 23 in the (not illustrated) memory device that has already been briefly mentioned above and that is connected with the data output control device 22 (or the software program or the software program module 23, respectively). By this measure it is possible that they are read out again at the respectively desired point in time only, i.e. possibly with delay, and are transmitted—as explained above possibly with delay—from the software program or software program module 23 to the software program or software program module 51, and/or—in particular—to the software program or the software program module 52, and are printed there.

In the above-mentioned "test operation mode" of the data output system 1—as has already been indicated above—in reaction to a corresponding test data output order it is, at first, not all the data sets or data set printing files, respectively, allocated to the corresponding data output order that are provided or compiled (in a finished manner) by the data output control device 2 and are stored in the above-mentioned memory device 40, but merely the above-mentioned subset thereof defined by the data stored in the database 60. These data sets are—as has been explained above, as a rule, immediately after providing or compiling—forwarded to the further data output control device 22, and are printed, as a rule, without delay. The remaining data sets allocated to the corresponding "complete" data output order may—as explained above (partially also in parallel thereto)—at first be compiled only partially or incompletely, and, only after a "release", be compiled completely, be stored in the memory device 40 and—possibly after a further, "conscious" delay—be forwarded to the data output control device 22 and—possibly after an additional "conscious" delay—be printed.

While the invention has been described with reference to certain embodiments, it will be understood by those skilled in the art that various changes may be made and equivalents may be substituted without departing from the scope of the invention. In addition, many modifications may be made to adapt a particular situation to the teachings of the invention without departing from its scope. Therefore, it is intended that the invention not be limited to the particular embodiment disclosed, but that the invention will include all embodiments falling within the scope of the appended claims.

What is claimed is:

1. A data output system for the output of bank account data, comprising:
a printing device;
a database device, in which corresponding control data are stored for a plurality of data output system users; and
a data output control device that in a normal operating mode of the system delivers, at points in time determined by the data output control device, output data sets allocated to a corresponding normal data output order to the printing device, wherein in a test operating mode of the system a predefined subset of bank account output data sets allocated to a test data output order is—for performing a test printing—delivered to the printing device, wherein in the test operating mode each bank account data set of the predefined subset of the bank account output data sets allocated to the test data output order is completely compiled and then readily provided to an intermediate database and the printing device, separate from the intermediate database, and wherein when a further, highest priority, data output order is triggered during the test operating mode, the test data output order is deferred, and firstly bank account output data sets allocated to the further data output order are compiled and provided,
whereas each remaining bank account output data set allocated to the test data output order is completely compiled and then readily provided to the intermediate database and the printing device, separate from the intermediate database only after releasing of the test printing.

2. The data output system according to claim 1, wherein the predefined subset of the output data set allocated to the test data output order is printed at the printing device as a test printing.

3. The data output system according to claim 2, wherein—after the printing of the predefined subset of the output data set allocated to the test data output order—the remaining data sets are printed at the printing device.

4. The data output system according to claim 1, wherein a part of the data contained in the predefined subset of the output data sets allocated to the test data output order is not printed.

5. The data output system according to claim 4, wherein data sets that are not printed are data identifying the respective user.

6. The data output system according to claim 1, wherein a part of the printed data contained in the predefined subset of the output data sets allocated to the test data output order is overprinted.

7. The data output system according to claim 6, wherein the data are overprinted such that they are illegible.

8. The data output system according to claim 6, wherein the overprinted data are data identifying the respective user.

9. The data output system according to claim 1, wherein the predefined subset of the output data sets allocated to the test data output is printed at the printing device together with additional data characterizing the print-out as test printing.

10. The data output system according to claim 1, wherein the control data stored in the database device contain user priority data allocated to a particular user.

11. The data output system according to claim 10, wherein, prior to the advance delivery of the predefined subset of the output data sets allocated to the test data output, output data sets of users having user priority data characterizing a high user priority are delivered to the printing device and are printed.

12. The data output system according to claim 10, said system comprising means for defining the user priority data by a systems administrator.

13. The data output system according to claim 10, said system comprising means for defining the user priority data by the respective user.

14. The data output system according to claim 1, wherein the predefined subset of the output data sets allocated to the test data output is printed at the printing device on a separate paper roll or on a separate endless paper printed in batch printing, respectively.

15. The data output system according to claim 14, wherein—after the printing of the predefined subset allocated to the test data output—remaining data sets are printed at the printing device on one or several further paper rolls, or on a separate paper roll, respectively, in particular such that one paper roll each is completely printed with the respectively delivered output data sets.

16. A data output method, comprising a printing device, a database device, in which corresponding control data are stored for a plurality of users, and a data output control device, wherein the method comprises the steps of:
delivering in a normal operating mode of the system bank account output data sets—allocated to a corresponding normal data output order—to the printing device at points in time determined by the data output control device;
delivering in a test operating mode of the system, in response to a data output order, a predefined subset of bank account output data sets allocated to a test data output order to the printing device for performing a test printing, wherein in the test operating mode each bank account output data set of the predefined subset of the output data sets is completely compiled and then readily provided to an intermediate database and the printing device, separate from the intermediate database, and
deferring the test data output order when a further, highest priority, data output order is triggered during the test operating mode, and firstly compiling and providing bank account output data sets allocated to the further data output order,
whereas each remaining bank account data set allocated to the test data output order is completely compiled and then readily provided to the intermediate database and the printing device, separate from the intermediate database only after releasing of the test printing.

17. A computer-readable storage medium for storing a computer program with program code means for performing the method steps indicated in claim 16 when the program is executed on a computer.

18. The computer-readable storage medium according to claim 17, said computer readable storage medium comprising a computer diskette.

19. The data output method according to claim 16, wherein the data order output in the testing mode is processed with a higher priority than that for a normal data output order.

20. The data output system according to claim 1, wherein the data order output in the testing mode is processed with a higher priority than that for a normal data output order.

* * * * *